United States Patent [19]
Cinzori

[11] 3,931,521
[45] Jan. 6, 1976

[54] DUAL SPECTRUM INFRARED FIRE DETECTOR

[75] Inventor: Robert J. Cinzori, Santa Barbara, Calif.

[73] Assignee: Hughes Aircraft Company, Culver City, Calif.

[22] Filed: June 29, 1973

[21] Appl. No.: 375,265

[52] U.S. Cl. .................. 250/339; 250/340; 250/349
[51] Int. Cl.² .................. G01J 1/00
[58] Field of Search .......... 250/338, 339, 340, 349; 340/227 R, 228 R

[56] References Cited

UNITED STATES PATENTS

| | | | |
|---|---|---|---|
| 2,692,982 | 10/1954 | Metcalf | 250/339 |
| 3,476,938 | 11/1969 | Jankowitz et al. | 250/338 |
| 3,665,440 | 5/1972 | McMenamin | 250/338 X |
| 3,792,275 | 2/1974 | Leftwich | 250/338 |

*Primary Examiner*—Davis L. Willis
*Attorney, Agent, or Firm*—William J. Bethurum; W. H. MacAllister

[57] ABSTRACT

Disclosed is a fire and explosion detection system wherein long wavelength radiant energy responsive signals are processed in one channel and compared to short wavelength radiant energy responsive signals which are processed in a second channel. When these signals are coincident in response to a fire or explosion of a predetermined threshold magnitude, an output fire suppression signal is generated.

19 Claims, 4 Drawing Figures

DUAL SPECTRUM INFRARED FIRE DETECTOR

FIELD OF THE INVENTION

This invention relates generally to fire and explosion detection and suppression systems and more particularly to a fast acting long and short wavelength responsive multichanel radiation detector.

BACKGROUND

Fire detection systems which respond to the sudden presence of either a flame or an explosion to thereby generate an output control signal are generally known. Such systems have a very significant utility, for example, in applications with a variety of explosive or fuel transport storage tanks, and these systems normally function to trigger the operation of a fire suppression mechanism within a few milliseconds after the initiation of a fire or explosion. It is frequently desirable to wire these fire detectors into military armored personnel carrier vehicles which transport various arms and explosives. A possible explosion commonly desired to be suppressed by these types of fire detection systems is one which is produced in a fuel tank by a high energy anti-tank round of ammunition fired into the fuel tank from a remote location.

PRIOR ART

Hitherto, fire detection and suppression systems of the above type employed one or more photon responsive short wavelength photodetectors. These photodetectors sense the energy from radiation, such as infrared or ultraviolet radiation in a particular spectral band and characteristic of certain chemical elements or compounds within a given fire or explosion. Signals from these photodetectors are properly compared and processed in order to generate a fire control output signal. A disadvantage with this type of prior art fire detection system is that the system is wholly dependent for its proper operation upon receiving the proper photon energy within a given spectral band and from the true source of interest, namely the fire. As a result, these prior art fire detection systems are frequently subject to false operation in response to extraneous noise or other source radiation which are not associated with a fire or explosion.

Various circuit techniques have been devised to discriminate against these latter sources of extraneous radiation. But these techniques have not been totally practical or satisfactory for all conditions of operation and in the many noisy environments in which the fire detection system must be capable of operating.

The general purpose of this invention is to provide a fire detection system which is totally immune to false triggering from short wavelength radiation alone, and which possesses many, if not all, of the advantages of similarly employed prior art detection systems, while possessing none of their aforedescribed significant disadvantages. To attain this purpose, I have devised a multichannel fire detection system which is responsive to a combination of radiant energy in the 7–30 micron (long wavelength) spectral band and radiant energy in the 0.7–1.2 micron (short wavelength) spectral band to generate an output control signal for suppressing the fire or explosion. In my system, the long wavelength radiation from a fire or explosion must be present in combination with the short wavelength radiation from the fire or explosion in order to generate the output signal utilized for actuating a fire control mechanism. Thus, the present system cannot be falsely triggered solely by short wavelength sources of radiation.

To specifically accomplish the above novel operation, the present invention utilizes a long wavelength energy responsive thermal detector in one signal processing channel and utilizes a short wavelength responsive infrared photodetector in another signal processing channel. The use of a thermal detector, such as a thermopile, in this manner is a complete departure from conventional radiation sensing techniques of any prior art fire detection system known to me. One of the reasons that thermal devices have not hitherto been attractive in fire detection systems is that the responsivity of these thermal devices begins to roll off rather steeply at approximately 3.0 Hertz. However, in accordance with the present invention, this latter problem has been solved by the use of a unique frequency compensating amplifier which is connected to the output of the thermal detector. This amplifier provides a substantially constant overall signal gain between the input of the detector and the output of the amplifier for the input frequency range of interest.

Accordingly, an object of the present invention is to provide a new and improved highly sensitive fire and explosion detection system.

Another object is to provide a detection system of the type described which is highly responsive to the presence of a combination of long and short wavelength radiant energy from a fire or explosion to in turn generate an output control signal within a minimum elapsed time after the initiation of the fire or explosion.

Another object is to provide a detection system of the type described which is free from false operation solely by short wavelength sources of radiation.

Another object is to provide a detection system of the type described which is relatively simple and economical in construction and reliable and durable in operation.

DRAWINGS

DESCRIPTION OF PREFERRED EMBODIMENT

Figure 1:
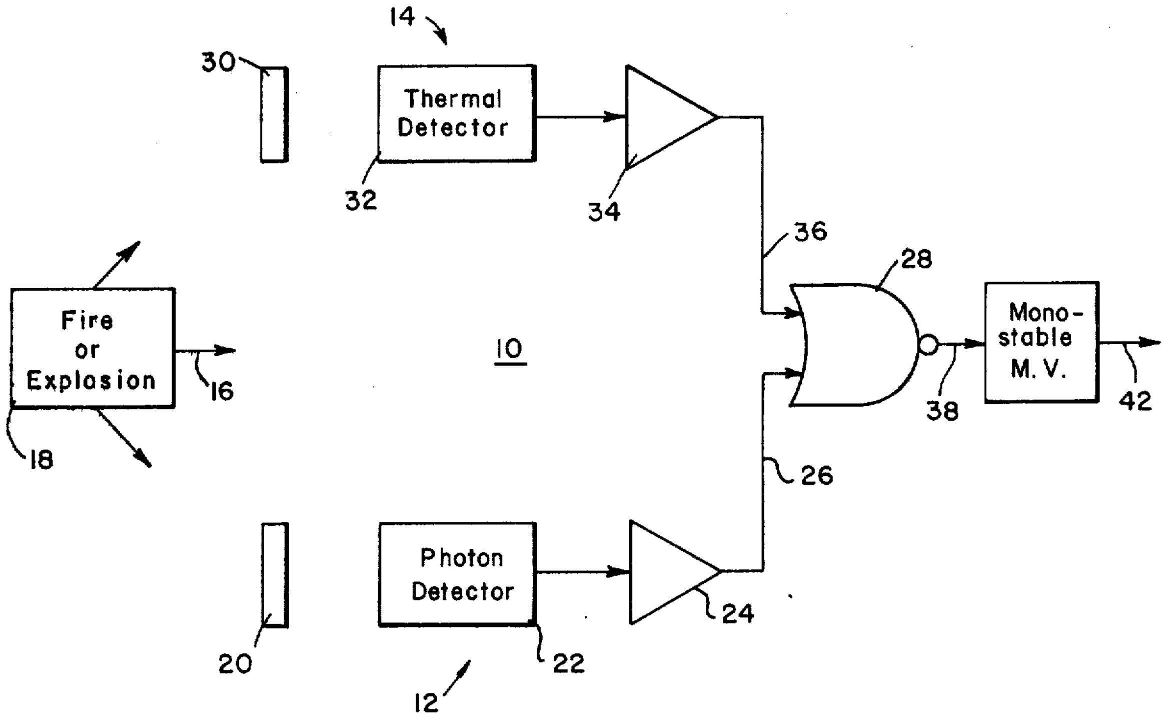
FIG. 1 is a block diagram representation of the fire and explosion detection system according to the invention.

Referring now to FIG. 1, the multichannel fire detector, designated generally 10, includes a short wavelength radiation responsive channel 12 and a long wavelength radiation responsive channel 14 coupled respectively to receive radiant energy 16 from a nearby or remote fire or explosion 18. The system is typically designed so that it is highly responsive to high energy fuel-type explosions out to distances on the order of 6 yards. The radiant energy 16 of interest in channel 12 is that radiation in the near infrared region of the electromagnetic frequency spectrum, whereas the radiant energy from source 18 of interest in channel 14 lies in the far infrared region of the electromagnetic frequency spectrum.

The short wavelength channel 12 includes a suitable conventional optical filter 20 for passing radiation wavelengths only in the spectral band of interest, which in the present embodiment is on the order of 0.7–1.2 microns. The radiation thus passed impinges on a detector 22, such as a silicon photodetector, which generates an output detection signal at the input of an amplifier 24. The amplifier 24 has its output connected as shown to one input 26 of a NOR and threshold gate 28.

The long wavelength channel 14 also includes a conventional optical filter 30 for passing radiation wavelengths in the range of 7–30 microns, and the energy thus passed impinges on a thermal detector 32. This detector may advantageously be either a thermistor, thermopile, or any other detector sensitive to these wavelengths for generating an output signal which is coupled to an input of a frequency compensating amplifier stage 34. The latter amplifier has its output connected to a second input 36 of the NOR and threshold gate 28, and this latter gate is operative in response to input signals on lines 26 and 36 to generate an output pulse on line 38, as will be further described. This output pulse on line 38 triggers a monostable multivibrator 40 which is internally connected with appropriate RC time constants in its feedback network to generate an output pulse of a predetermined time duration. The latter output pulse is further processed in driver electronics (not shown) for driving and triggering a suitable fire suppression mechanism.

The system shown in FIG. 1 is thus operative to compare the radiant energy in two different spectral bands of the frequency spectrum and generate an output signal on line 42 only during the presence of both long and short wavelength energy from source 18 at levels above a chosen threshold level or levels. This threshold level may, of course, be controlled internally in either the electronics of the amplifiers 24 and 34 or the internal electronics of the NOR and threshold gate 28. Thus, the system in FIG. 1 will discriminate against radiant energy from short wavelength only sources or from long wavelength only sources and against any other radiant energy sources which generate radiation below a given preestablished energy threshold. The system in FIG. 1 was specifically conceived to respond to fires or explosions where there is always the presence of a combination of long and short wavelength radiation above given thresholds. The wavelength of the photon radiation received in channel 12 is frequently dependent upon the characteristic radiation of the elements or compounds within the chemical matter burned or exploded.

As previously mentioned, the detection channel 12 was designed to respond to short wavelength radiation in the 0.7–1.2 micron range, whereas channel 14 is responsive to 7–30 micron radiation. The main reason for choosing the 7–30 micron band was to optimize the overall signal to noise ratio (S/N) of the system; the signal being the fire and the noise being the sun and other radiation sources. Typical hydrocarbon fires radiate the greatest amount of IR energy in the 2–6 micron band; but the sun also emitts a great deal of energy in the same band, and as a result, the sun is capable of falsely triggering the detection system. Such false triggering would occur, for example, (and in the absence of channel 12) if some object were to pass between the sun and the detector 32 to thereby produce a time varying signal at detector 32 and acceptable by the bandwidth of channel 14. The same false triggering could be produced, for example, by portable heaters, hot exhaust manifolds, or other steady state sources of radiation in the bandwidth of channel 14 and capable of producing a time varying signal at detector 32 when momentarily shielded by a moving object. This possibility of false triggering has been eliminated herein by the use of channel 12 whose 0.7–1.2 bandwidth response is below that of all steady state radiation sources capable of generating an output signal in channel 14.

It has been found that the signal-to-noise ratio of the system when operating in the 2–6 micron band could vary from 0.4 to 10:1 depending upon the size of the fire and the kind of material burning. However, it was observed that if the 7–30 micron band was used, the S/N ratio of the system would vary from 15 to 60:1, depending upon the size of the fire and material burning. Thus, by operating channel 14 in the 7–30 micron band as compared to the 2–6 micron band, a system S/N improvement of greater than 10:1 can be realized.

For explosive type fires, the S/N improvement discussed above is not necessary. However, most military requirements demand that the fire detection system be capable of sensing small pan type fires on the order of one square foot in addition to explosive type fires. This requirement, therefore, demands that the system operate in the 7–30 micron wavelength region.

The reason for choosing the 0.7–1.2 micron spectral band for the detection channel 12 is that the responsivity of silicon photodetectors, e.g. 22, peaks at approximately 0.9 micron, and these photodetectors are readily and commercially available, relatively low in cost, and have adequate S/N ratios which are compatible with my dual channel system.

Figure 2:
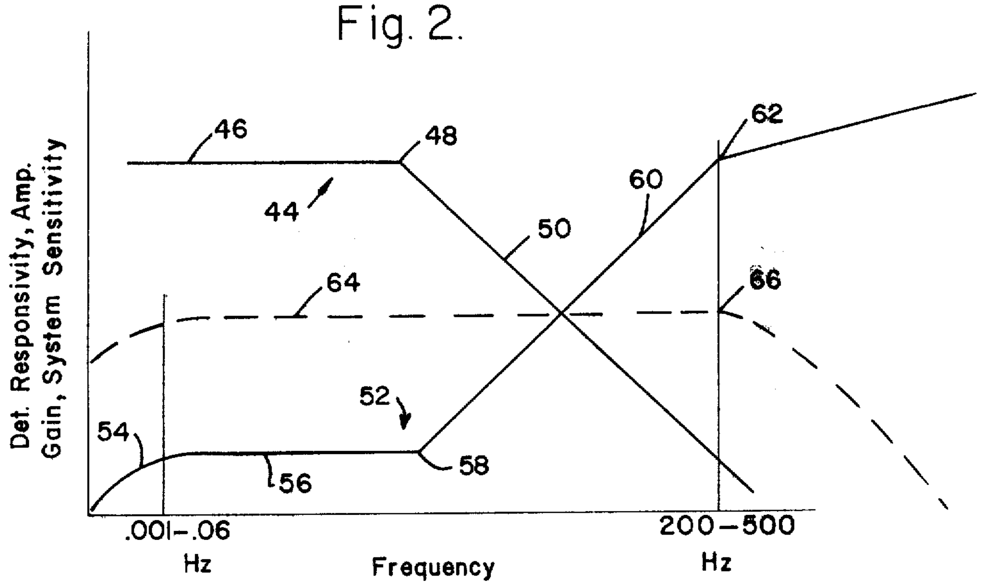
FIG. 2 is a graph showing the responsivity and gain versus frequency characteristics of the detector and amplifier, respectively, in the long wavelength responsive signal processing channel of FIG. 1.

Referring now to FIG. 2, the thermal detector 32 was not an obvious choice for providing the necessary radiation detection in one of the two channels. This is partially a result of its responsivity (R) versus frequency characteristic 44, which has a substantially flat response 46 for a limited frequency range, but begins to roll off in R rather steeply at point 48 corresponding to approximately 3.0 Hertz. Since the thermal detector 32 must respond to electrical frequencies in excess of approximately 100 Hertz, a frequency compensating amplifier 34 with a compensating gain versus frequency characteristic 52 is utilized in order to provide a substantially constant overall sensitivity for the two stages 32 and 34 in the frequency range of interest. This range extends from approximately 0.001 Hertz out to frequencies as high as 500 Hertz.

The gain versus frequency characteristic 52 increases asymptotically initially at region 54 up to a substantially constant value 56 where it remains flat out to a point 58 corresponding to the point 48 on the responsivity versus frequency characteristic of the detector 32. At point 58, the gain of the amplifier 34 begins increasing sharply as noted at slope 60 until reaching a point 62 where it again begins to flatten out somewhat as indicated. The combined effect of these two responsivity and gain versus frequency characteristics 44 and 52 is shown in the overall channel sensitivity curve 64 for the two stages 32 and 34. The latter curve is substantially constant out to an upper frequency value at point 66, which may be typically anywhere from between 200 and 500 Hertz, depending upon the specific type of amplifier and detector used.

Figure 3:
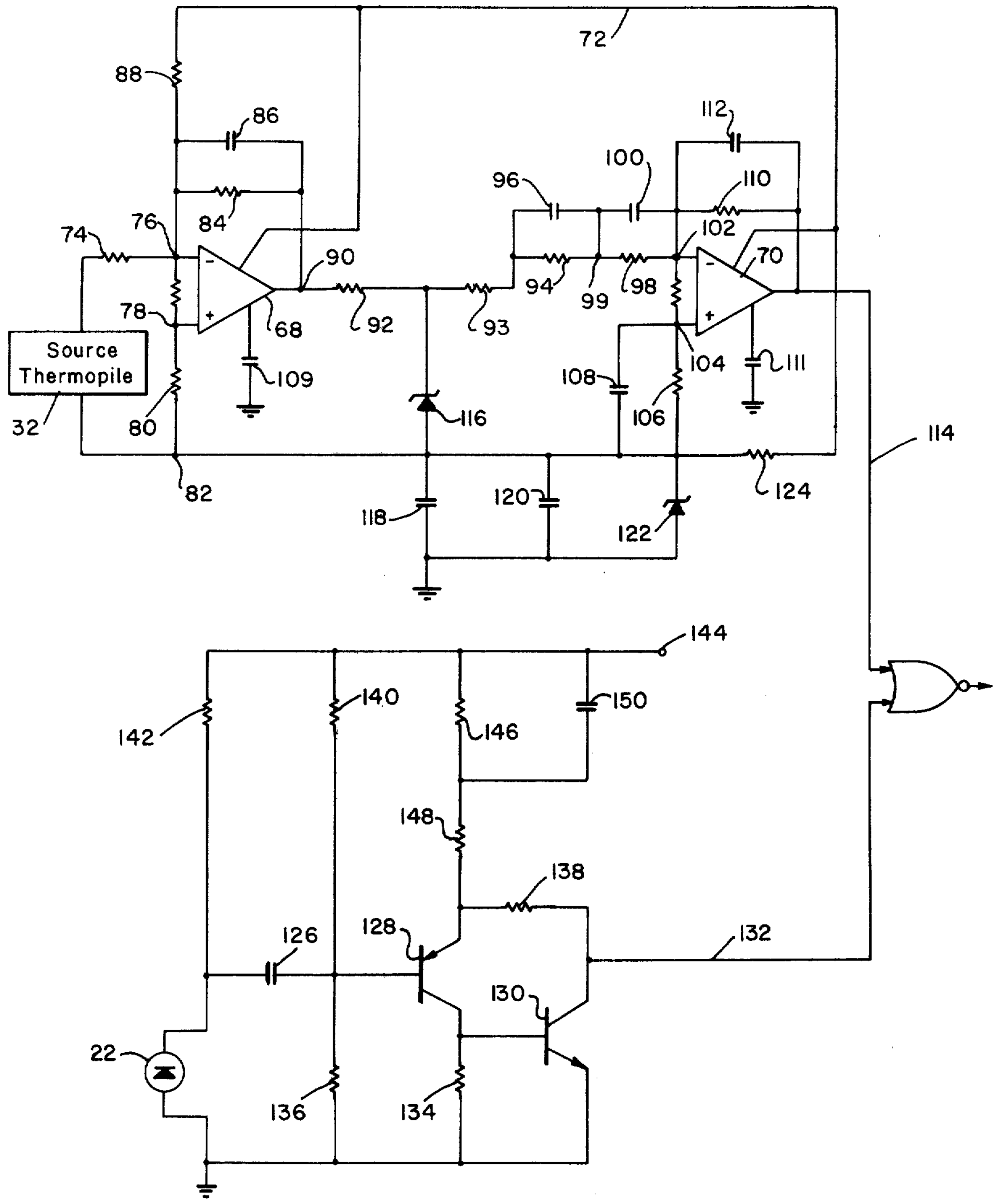
FIG. 3 is a schematic diagram of the input detector and amplifier circuitry of the system shown in FIG. 1.

The above-described composite channel sensitivity curve 64 illustrated in FIG. 2 has been achieved by the use of the amplifier circuitry which is illustrated schematically in FIG. 3. The frequency compensating amplifier stage 34 includes a first differential operational amplifier 68 which is cascaded as shown to the input of a second differential operational amplifier 70. These two amplifiers 68 and 70 are connected with appropriate individual amplifier feedback shown. The initial amplifier stage 68 provides the necessary DC signal amplification whereas the second op amp stage 70 provides the necessary gain versus frequency compensation for matching the thermopile detector 32.

The thermal sensor 32 is preferably a thermopile detector consisting of a series of thermocouples which are made by a thin film evaporation process. The thermopile detector 32 produces a voltage output signal when radiant energy is radiated onto its collector (not shown), and the transfer function or responsivity, R, of the detector 32 was approximately 20 volts per watt for a thermopile actually used. This thermopile was made by the Santa Barbara Research Center of Goleta, California, and is a bizmuth-antimony type detector with an approximately 2 millimeter round sensing area.

The thermopile detector 32 is connected through a gain adjustment resistor 74 to one differential input 76 of the operational amplifier 68. The other input 78 of this amplifier 68 is connected through an input resistor 80 to a point 82 of approximately 6.8 volt reference potential. The signal feedback path for the amplifier 68 includes a resistor 84 and a capacitor 86 connected as shown, and a resistor 88 interconnects the amplifier stage 68 to the regulated B+ supply voltage on line 72. The line 72 carries +17 volts bias for the two operational amplifiers 68 and 70, and this line is resistively connected via the voltage dropping resistor 124 to the point 82 of 6.8 volt reference potential.

The output terminal 90 of the operational amplifier 68 is connected by way of series resistors 92 and 93 to the input of a first RC network consisting of resistor 94 and capacitor 96. A second RC network consisting of resistor 98 and capacitor 100 interconnects the amplified signal at junction 99 to one input 102 of the second differential operational amplifier 70. The other input 104 of this latter amplifier 70 is connected through a resistor 106 to the point 82 of 6.8 volt reference potential, and a capacitor 108 is connected as shown in parallel with the resistor 106. The feedback path for the amplifier 70 includes a resistor 110 and a capacitor 112 connected in parallel as shown, and the output signal from the amplifier 70 is coupled via line 114 to the input 36 of the NOR gate 28 shown in FIG. 1. Each of the two amplifiers 68 and 70 are connected to ground through two 100 pf frequency compensation capacitors 109 and 111, respectively.

The resistor 124, zener diode 122 and capacitors 118 and 120 generate the +6.8 volt reference voltage at point 82, and the capacitors 118 and 120 decouple the B+ supply voltage from the amplifier signal path. The resistor 88 and diode 116 form a negative voltage clamp on the output of operational amplifier 68 and prevent AC differentiation of cold to warm background signals which could cause false triggering.

The operational amplifier 68 is a DC amplifier which provides an initial stage of gain, and the two RC networks (components 94, 96, 98, 100) in combination with the operational amplifier 70 provides the gain versus frequency characteristic 52 as shown in FIG. 2. The point 54 on this characteristic is controlled by the value of components 94 and 100; point 58 is controlled by the values of components 94 and 96 and point 62 is controlled by the values of components 92, 93, and 96.

In the embodiment of the invention actually reduced to practice, detector 22 was a silicon photodiode type S601-35 made by Electro Nuclear Laboratories, Inc., of Menlo Park, Calif. The output signal from this photodiode 22 is coupled through an input coupling capacitor 126 to the base of a PNP transistor 128. The transistor 128 and an output NPN transistor 130 are cascaded as shown to provide the necessary amplification for the photodiode signal, which, when amplified, is coupled via line 132 to the other input 26 of the NOR gate 28. The transistors 128 and 130 are connected to the necessary and conventional bias, feedback and current limiting resistors 134, 136, 138, 140 and 146 for biasing these transistors to non-conduction in the absence of an input signal from the diode 22. The resistor 142 is adjustable in order to vary the overall sensitivity of this detector 22. The gain of amplifier 24 is controlled by the values of resistors 138 and 148. A DC supply voltage for the stage 24 is connected at terminal 144 to provide the necessary operating power for this amplifier stage, and a filter capacitor 150 is connected across resistor 146 for the purpose of decoupling the bias supply from the circuit.

Figure 4:
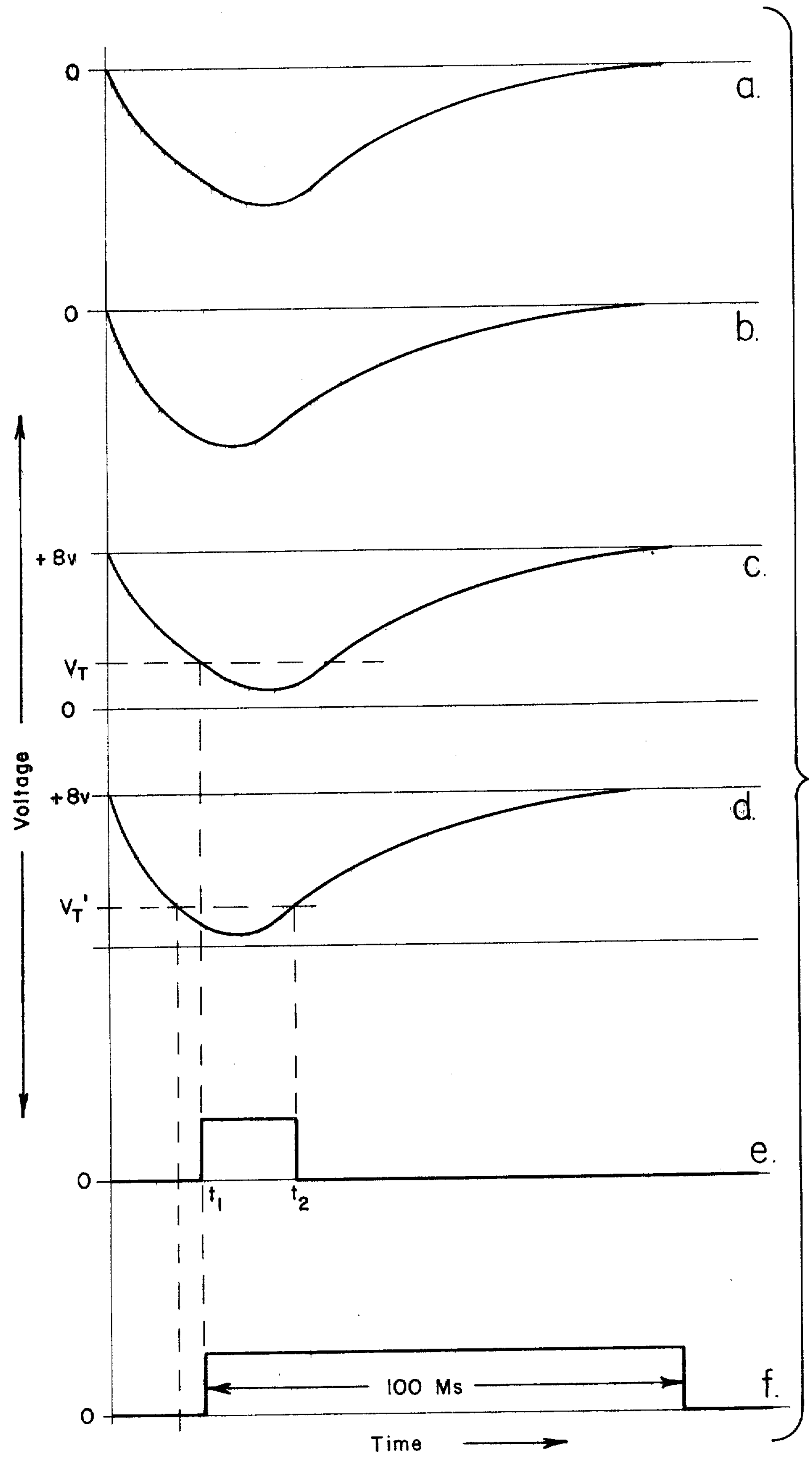
FIG. 4 is a waveform diagram illustrating the multichannel switching action in FIG. 1 in response to long and short wavelength radiant energy from a fire or explosion.

Referring now to FIG. 4, there are shown a series of signal waveform diagrams at various circuit points and illustrated successively in FIGS. *4a–4f*. The overall system operation of the above-described fire and explosion detector will be described with reference to these figures. At the instantaneous initiation of a fire or explosion, when time $t=0$, the long wavelength radiation received in channel 14 will cause the output voltage of the detector 32 to fall as shown in FIG. 4*a*. Simultaneously, the short wavelength radiation causes the output voltage of the photodetector 22 to fall as shown in FIG. 4*b*.

The output signals in FIGS. 4*a* and 4*b* generate the corresponding decreasing voltages shown in FIGS. 4*c* and 4*d*, respectively, at the output of the respective amplifiers 34 and 24. Once the voltages in FIGS. 4c and 4d both fall below the indicated +3.5 threshold voltage (Vt and Vt') of NOR gate 28, the output NOR gate 28 is switched from a low or ground logic level to a +8 volt, high logic level at time $t_1$. Vt and Vt' denote the threshold voltage levels sufficient to produce an output signal when these voltage levels are properly compared in the NOR gate 28. The output voltage of the NOR gate 28 remains at this +8 volt level until the first of the two signals applied thereto (FIG. 4d) again rises above +3.5 volts (on line 26) at time $t_2$. At this time the output voltage on line 26 drives the NOR gate 28 back down to its low or ground logic state, thus completing the output pulse shown in FIG. 4*e*.

The instant the output voltage on line 38 goes positive as shown in FIG. 4*e*, it triggers the monostable multivibrator 40. The R-C components (not shown) within the feedback loop of the multivibrator 40 determine the duration of the output pulse shown in FIG. 4*f* and appearing on line 42. For the present design, the pulse width in FIG. 4f was approximately 100 milliseconds. This output pulse may typically be used to trigger various electromechanical means necessary to initiate the fire or explosion suppression mechanism (not shown).

While the invention described above is designed to operate in the disclosed preferred specific 0.7–1.2 micron and 7–30 micron wavelength ranges, the true scope of the invention is not limited to these ranges.

For example, it may be preferred to operate the photodiode channel 12 at wavelengths shorter than 0.7 microns, provided that cheaper detectors with shorter wavelength response become available. Furthermore the wavelength response of channel 14 could be changed to operate from 6 to 13 microns, if this more limited wavelength range is compatible with a particular system signal to noise ratio requirement.

It should also be emphasized at this point that under certain and proper conditions of operation, a single channel system wherein only channel 14 is utilized to generate an output signal is entirely satisfactory and, we believe, novel per se. Mention has previously been made of the reason for having a second channel 14 in order to prevent time varying signals chopped from steady state radiation sources from producing an extraneous output signal at the output of channel 14. However, if this chopping possibility could be eliminated, for example, by suitably mounting the detection system in the engine compartment of a vehicle, then the second channel 12 may be entirely unnecessary.

Finally, it is to be understood that the present invention is not limited to the particular type of detectors used. For example, germanium, lead selenide, and lead sulphide detectors, and thermistor bolometers can be used in the short wavelength channel 14, whereas mercurycadmium-telluride, zinc-doped germanium, or copper-doped germanium detectors can be used in the long wavelength channel 14. As more and more detectors become available, in the future it is possible that it will be desirable from a cost and performance standpoint to replace the detectors 12 and 32 disclosed herein with these other types of detectors.

It should also be understood that the present invention is not limited in its use to any particular type of output fire suppression means. One suitable technique for suppressing fires and explosions which is most compatible for use with the detection system described above utilizes a plurality of pressurized freon gas bottles, each of which are electro-mechanically driven by a count down (not shown) register at the output of the above described system. Each successive output pulse generated by the system can be utilized to drive the count down register (which is of conventional design), so as to activate a separate bottle each time there is a fire or explosion. In this manner the system can be used to fully guard against a condition where the system operates to extinguish an initial fire, and then is not equipped for further response to a delayed or secondary fire, or even to a second primary fire which occurs later at the same location. As a practical matter, the pressurized bottles of freon are presently commercially available and contain the necessary gas exit orifices, so that the freon gas exits these orifices under a very high pressure and completely empties the bottle in about 10 milliseconds or less.

What is claimed is:

1. An electrical detection system responsive to a fire or explosion for generating an output signal, including in combination:

a. long wavelength channel means responsive to radiant energy in a predetermined spectral band above about six microns of electromagnetic radiation and received from a fire or explosion for generating a first logic signal, b. short wavelength channel means responsive to radiant energy in a predetermined spectral band less than about two microns of electro-magnetic radiation and received from said fire or explosion for generating a second logic signal, and c. output gate means coupled to receive both said first and second logic signals and responsive thereto to generate said output control signal which may be further processed to control the suppression of said fire or explosion.

2. The system defined in claim 1 wherein said long wavelength channel means is responsive to radiation in the 7–30 micron range and said short wavelength channel means is responsive to radiation in the 0.7–1.2 micron range.

3. The system defined in claim 1 wherein said long wavelength channel means includes:

a. a far infrared radiation detector connected at the input of said channel means and responsive to fire or explosion induced changes in temperature for generating a low level detection signal, and b. a frequency compensating amplifier coupled between said far infrared radiation detector and said output gate means and having a gain versus frequency characteristic which substantially compensates for the roll off in the gain versus frequency characteristic of said detector, thereby maintaining a substantially constant signal gain between the input of said detector and the output of said compensating amplifier over a predetermined frequency range.

4. The system defined in claim 1 wherein said short wavelength channel means includes a radiation detector sensitive only to radiation less than about 1.2 microns.

5. The system defined in claim 1 wherein:

a. said long wavelength channel means includes a thermal detector responsive to radiation in the far infrared region of the electromagnetic frequency spectrum, and b. said short wavelength channel means includes a silicon photodetector responsive to short wavelength radiation in the near infrared region of the electromagnetic frequency spectrum, whereby short wavelength and long wavelength radiation changes are electrically compared before an output signal is generated.

6. The system defined in claim 1 wherein said output gate means is a digital logic gate connected to drive a monostable multivibrator or other driver circuit, whereby said multivibrator or other suitable driver circuit is operative to generate an output pulse for ultimately controlling a fire suppression mechanism.

7. The system defined in claim 1 wherein:

a. said long wavelength channel means includes a thermal detector responsive to radiation source temperature changes for generating an output detection signal, b. a frequency compensating amplifier connected to the output of said thermal detector and having a gain versus frequency characteristic which substantially compensates for the roll off in the gain versus frequency characteristic of said thermal detector, whereby the overall gain of said thermal detector and said frequency compensating amplifier is substantially constant over a predetermined frequency range, and c. said short wavelength radiation channel means includes a semiconductive photodetector for generating an output detection signal proportional to the photon induced carrier recombination therein, whereby both of the above said detectors must generate an output signal in order to produce a corresponding output signal at the output of said output gate means.

8. The system defined in claim 7 wherein:

a. said thermal detector is a thermopile detector responsive to source temperature changes induced by radiation in the far infrared region of the electromagnetic frequency spectrum, and b. said photodetector is a silicon photodetector responsive to photon energy from radiation in the near infrared region of the electromagnetic frequency spectrum.

9. The system defined in claim 8 wherein said output gate means includes threshold means for providing a predetermined threshold level therein which must be exceeded by said first and second logic signals in order to generate said output signal.

10. An electrical system responsive to radiation generated by a fire or explosion including, in combination:

a. an optical filter for passing electromagnetic radiation in a predetermined wavelength range of the electromagnetic frequency spectrum, b. a thermopile detector optically coupled to said filter and responsive to ambient temperature changes induced by infrared radiation above 6 microns in wavelength and received from said filter for generating an output signal, and c. means for processing said output signal from said thermopile detector and for utilizing same to control the suppression of said fire or explosion/./, said signal processing means includes a frequency compensating amplifier stage coupled to said thermopile detector and which compensates for the roll off in responsivity of said thermopile detector.

11. The system defined in Claim 10 which further includes:

a. a second optical filter for passing infrared radiation in another predetermined wavelength range of the electromagnetic frequency spectrum, b. a photon detector coupled to said second optical filter for generating a photon energy dependent output voltage, and c. gate means within said signal processing means for comparing the output signals of said thermopile and photon detectors and generating an output control signal upon the coincidence of said detector output signals above a preestablished threshold.

12. The system defined in claim 11 which further includes amplifier means coupled between said photon detector and said gate means for providing appropriate signal amplification for said photon energy.

13. The system defined in claim 11 wherein said first named optical filter passes radiation wavelengths between about 7 and 30 microns and said second optical filter passes radiation wavelengths between about 0.7 and1.2 microns.

14. A detection system for generating an output signal in response to a fire or an explosion and comprising: long wavelength channel means including a thermopile detector responsive to radiant energy in a predetermined spectral band above 6 microns wavelength of electromagnetic radiation and received from said fire or explosion, said long wavelength channel means further including a frequency compensating amplifier coupled to said detector and having a gain versus frequency characteristic selected to compensate for the roll off in responsivity of said thermopile detector and to thereby provide a substantially constant sensitivity to radiation received in a predetermined frequency range, and said long wavelength channel means further including means coupled to said frequency compensating amplifier for generating a logic signal capable of triggering means to suppress or control said fire or explosion.

15. The system defined in claim 14 wherein said long wavelength channel means is responsive to radiation in the 7–30 micron wavelength range.

16. The system defined in Claim 15 wherein:

a. said thermopile detector is a far infrared radiation detector connected at the input of said long wavelength channel means and responsive to fire or explosion induced changes in incident radiation for generating a relatively low level frequency dependent detection voltage, and b. frequency compensating amplifier means coupled between said far infrared radiation detector and an output gate means and having a gain-versus-frequency characteristic which substantially compensates for the roll off in the gain-versus-frequency characteristic of said detector, thereby maintaining a substantially constant signal gain between the input of said detector and the output of said frequency compensating amplifier means over a predetermined frequency range.

17. The system defined in claim 16 wherein said far infrared radiation detector is responsive to radiation in the 7–30 micron wavelength range.

18. A process for detecting fires or explosions which includes the steps of:

a. sensing changes in incident short wavelength energy in the 0.7 – 1.2 micron range and resulting from said fire or explosion, b. simultaneously sensing changes in incident long wavelength energy in the 7 – 30 micron range and resulting from said fire or explosion, and c. electrically comparing the changes in incident short wavelength energy and long wavelength energy to thereby generate an output fire or explosion suppression signal once said changes simultaneously exceed a predetermined threshold level.

19. The process defined in claim 18 which further includes:

a. generating a frequency-dependent signal voltage in response to changes in signal voltage, said long wavelength energy, and b. amplifying said signal voltage in a manner to compensate for frequency-dependent amplitude variations in said signal voltage.

* * * * *